United States Patent
Ryu et al.

(10) Patent No.: US 11,916,726 B2
(45) Date of Patent: Feb. 27, 2024

(54) NETWORK ASSISTED SIDELINK BEAM FAILURE RECOVERY

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Jelena Damnjanovic, Del Mar, CA (US); Xiaoxia Zhang, San Diego, CA (US); Juan Montojo, San Diego, CA (US); Ling Ding, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 17/336,115

(22) Filed: Jun. 1, 2021

(65) Prior Publication Data

US 2022/0006688 A1  Jan. 6, 2022

Related U.S. Application Data

(60) Provisional application No. 63/047,825, filed on Jul. 2, 2020.

(51) Int. Cl.
*H04L 41/0668* (2022.01)
*H04W 4/40* (2018.01)
(Continued)

(52) U.S. Cl.
CPC ........ *H04L 41/0668* (2013.01); *H04L 1/1812* (2013.01); *H04L 5/0048* (2013.01);
(Continued)

(58) Field of Classification Search
CPC ...... H04W 4/40; H04W 72/20; H04L 1/1812; H04L 5/0048; H04L 5/0055
See application file for complete search history.

(56) References Cited

U.S. PATENT DOCUMENTS

| | | | |
|---|---|---|---|
| 2019/0166539 A1* | 5/2019 | Chen | ................. H04W 36/0088 |
| 2021/0044956 A1* | 2/2021 | Kim | ..................... H04L 1/1812 |

(Continued)

FOREIGN PATENT DOCUMENTS

| | | | | |
|---|---|---|---|---|
| WO | 2020030162 A1 | | 2/2020 | |
| WO | WO-2020030162 A1 * | | 2/2020 | .......... H04W 72/046 |

(Continued)

OTHER PUBLICATIONS

Xu et al., U.S. Appl. No. 62/908,480 dated Sep. 30, 2019.*

(Continued)

*Primary Examiner* — Kodzovi Acolatse
*Assistant Examiner* — Charles E Eckholdt
(74) *Attorney, Agent, or Firm* — Arun Swain

(57) ABSTRACT

A method of wireless communication by a first sidelink user equipment (UE) transmits a sidelink (SL) beam failure recovery (BFR) message to a communications node, indicating a new candidate beam and an identifier (ID) of a second sidelink UE. The method also receives an acknowledgment of the SL BFR message. A communications node receives a sidelink beam failure recovery message from a first sidelink user equipment, indicating a new candidate beam and an ID of a second sidelink UE. The method also transmits information identifying the new candidate beam and the ID to the second sidelink UE. Another method by a first sidelink user equipment receives a sidelink beam failure recovery message from a base station, indicating a new candidate beam and an ID of a second sidelink UE. The method changes a beam used to communicate with the (Continued)

second sidelink UE in response to receiving the BFR message.

23 Claims, 12 Drawing Sheets

(51) Int. Cl.
*H04L 1/1812* (2023.01)
*H04L 5/00* (2006.01)
*H04W 72/20* (2023.01)

(52) U.S. Cl.
CPC ............. *H04L 5/0055* (2013.01); *H04W 4/40* (2018.02); *H04W 72/20* (2023.01)

(56) References Cited

U.S. PATENT DOCUMENTS

| | | | | |
|---|---|---|---|---|
| 2021/0051057 A1* | 2/2021 | Tidestav | ............... | H04L 1/1829 |
| 2021/0084672 A1* | 3/2021 | Gulati | .................. | H04W 72/21 |
| 2021/0100059 A1* | 4/2021 | Xu | ........................ | H04L 5/0048 |
| 2021/0211348 A1* | 7/2021 | Li | ....................... | H04L 41/0677 |
| 2021/0212146 A1* | 7/2021 | Stirling-Gallacher | ...................... | H04B 7/0695 |
| 2022/0159583 A1* | 5/2022 | Wang | .................. | H04W 52/383 |
| 2022/0217743 A1* | 7/2022 | Zhou | ................. | H04W 72/1263 |

FOREIGN PATENT DOCUMENTS

| | | | | |
|---|---|---|---|---|
| WO | WO-2021252935 A1 * | 12/2021 | ........ | H04W 52/0225 |
| WO | WO-2022005683 A1 * | 1/2022 | ........... | H04L 1/1812 |
| WO | WO-2022036687 A1 * | 2/2022 | | |

OTHER PUBLICATIONS

Xu et al., U.S. Appl. No. 62/908,480 dated Sep. 2019.*
International Search Report and Written Opinion—PCT/US2021/035534—ISA/EPO—dated Sep. 8, 2021.
Spreadtrum Communications: "Consideration on Physical Layer Procedures", 3GPP Draft, R1-1813075, 3GPP TSG RAN WG1 Meeting #95, 3rd Generation Partnership Project (3GPP), Spokane, USA, Nov. 12-16, 2018, 5 Pages, XP051479343, Retrieved from the Internet: URL:http://www.3gpp.org/ftp/tsg%5Fran/WG1%5FRL1/TSGR1%5F95/Docs/R1%2D1813075%2Ezip.

* cited by examiner

NETWORK ASSISTED SIDELINK BEAM FAILURE RECOVERY

CROSS-REFERENCE TO RELATED APPLICATION

The present application claims the benefit of U.S. Provisional Patent Application No. 63/047,825, filed on Jul. 2, 2020, and titled "NETWORK ASSISTED SIDELINK BEAM FAILURE RECOVERY," the disclosure of which is expressly incorporated by reference in its entirety.

FIELD OF THE DISCLOSURE

Aspects of the present disclosure generally relate to wireless communications, and more particularly to techniques and apparatuses for vehicle-to-everything (V2X) network assisted sidelink beam failure recovery.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink user equipment (UEs), such as vehicles, may communicate directly with each other using device-to-device (D2D) communications over a D2D wireless link. These communications can be referred to as sidelink communications.

As the demands for sidelink communications increase, different V2X communications systems compete for the same wireless communications resources. Moreover, some sidelink UEs may be power limited. Accordingly, there is a need to improve the efficiency of sidelink wireless communications.

SUMMARY

According to aspects of the present disclosure, a method of wireless communication by a first sidelink user equipment (UE) includes transmitting a sidelink (SL) beam failure recovery (BFR) message to a communications node, indicating a new candidate beam and an identifier (ID) of a second sidelink UE. The method also includes receiving an acknowledgment of the SL BFR message.

In other aspects of the present disclosure, a method of wireless communication by a communications node includes receiving a sidelink (SL) beam failure recovery (BFR) message from a first sidelink user equipment (UE), indicating a new candidate beam and an identifier (ID) of a second sidelink UE. The method also includes transmitting information identifying the new candidate beam and the ID to the second sidelink UE.

In further aspects, a method of wireless communication by a first sidelink user equipment (UE) includes receiving a sidelink (SL) beam failure recovery (BFR) message from a base station, indicating a new candidate beam and an identifier (ID) of a second sidelink UE. The method also includes changing a beam used to communicate with the second sidelink UE in response to receiving the BFR message.

According to some aspects of the present disclosure, a first sidelink user equipment (UE) includes means for transmitting a sidelink (SL) beam failure recovery (BFR) message to a communications node, indicating a new candidate beam and an identifier (ID) of a second sidelink UE. The UE also includes means for receiving an acknowledgment of the SL BFR message.

In other aspects of the present disclosure, a communications node includes means for receiving a sidelink (SL) beam failure recovery (BFR) message from a first sidelink user equipment (UE), indicating a new candidate beam and an identifier (ID) of a second sidelink UE. The communications node also includes means for transmitting information identifying the new candidate beam and the ID to the second sidelink UE.

In further aspects, a first sidelink user equipment (UE) includes means for receiving a sidelink (SL) beam failure recovery (BFR) message from a base station, indicating a new candidate beam and an identifier (ID) of a second sidelink UE. The UE also includes means for changing a beam used to communicate with the second sidelink UE in response to receiving the BFR message.

According to yet other aspects of the present disclosure, an apparatus for wireless communication, in a first sidelink user equipment (UE), includes a processor, memory coupled with the processor, and instructions stored in the memory. The instructions are operable, when executed by the processor, to cause the apparatus to transmit a sidelink (SL) beam failure recovery (BFR) message to a communications node, indicating a new candidate beam and an identifier (ID) of a second sidelink UE. The instructions also cause the apparatus to receives an acknowledgment of the SL BFR message.

In other aspects of the present disclosure, an apparatus for wireless communication, in a communications node, includes a processor, memory coupled with the processor, and instructions stored in the memory. The instructions are operable, when executed by the processor, to cause the apparatus to receive a sidelink (SL) beam failure recovery (BFR) message from a first sidelink user equipment (UE), indicating a new candidate beam and an ID of a second sidelink UE. The instructions also cause the apparatus to transmit information identifying the new candidate beam and the ID to the second sidelink UE.

In further aspects, an apparatus for wireless communication, in a first sidelink user equipment (UE), includes a processor, memory coupled with the processor, and instructions stored in the memory. The instructions are operable, when executed by the processor, to cause the apparatus to receives a sidelink (SL) beam failure recovery (BFR) message from a base station, indicating a new candidate beam and an ID of a second sidelink UE. The instructions also cause the apparatus to change a beam used to communicate with the second sidelink UE in response to receiving the BFR message.

According to other aspects, a non-transitory computer-readable medium has program code recorded thereon. The program code is executed by a first sidelink user equipment (UE) and comprises program code to transmit a sidelink (SL) beam failure recovery (BFR) message to a communications node, indicating a new candidate beam and an ID of a second sidelink UE. The program code also includes program code to receive an acknowledgment of the SL BFR message.

In other aspects of the present disclosure, a non-transitory computer-readable medium has program code recorded thereon. The program code is executed by a communications node and comprises program code to receive a sidelink (SL) beam failure recovery (BFR) message from a first sidelink user equipment (UE), indicating a new candidate beam and an ID of a second sidelink UE. The program code also includes program code to transmit information identifying the new candidate beam and the ID to the second sidelink UE.

In further aspects, a non-transitory computer-readable medium has program code recorded thereon. The program code is executed by a first sidelink user equipment (UE) and includes program code to receive a sidelink (SL) beam failure recovery (BFR) message from a base station, indicating a new candidate beam and an ID of a second sidelink UE. The program code also includes program code to change a beam used to communicate with the second sidelink UE in response to receiving the BFR message.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
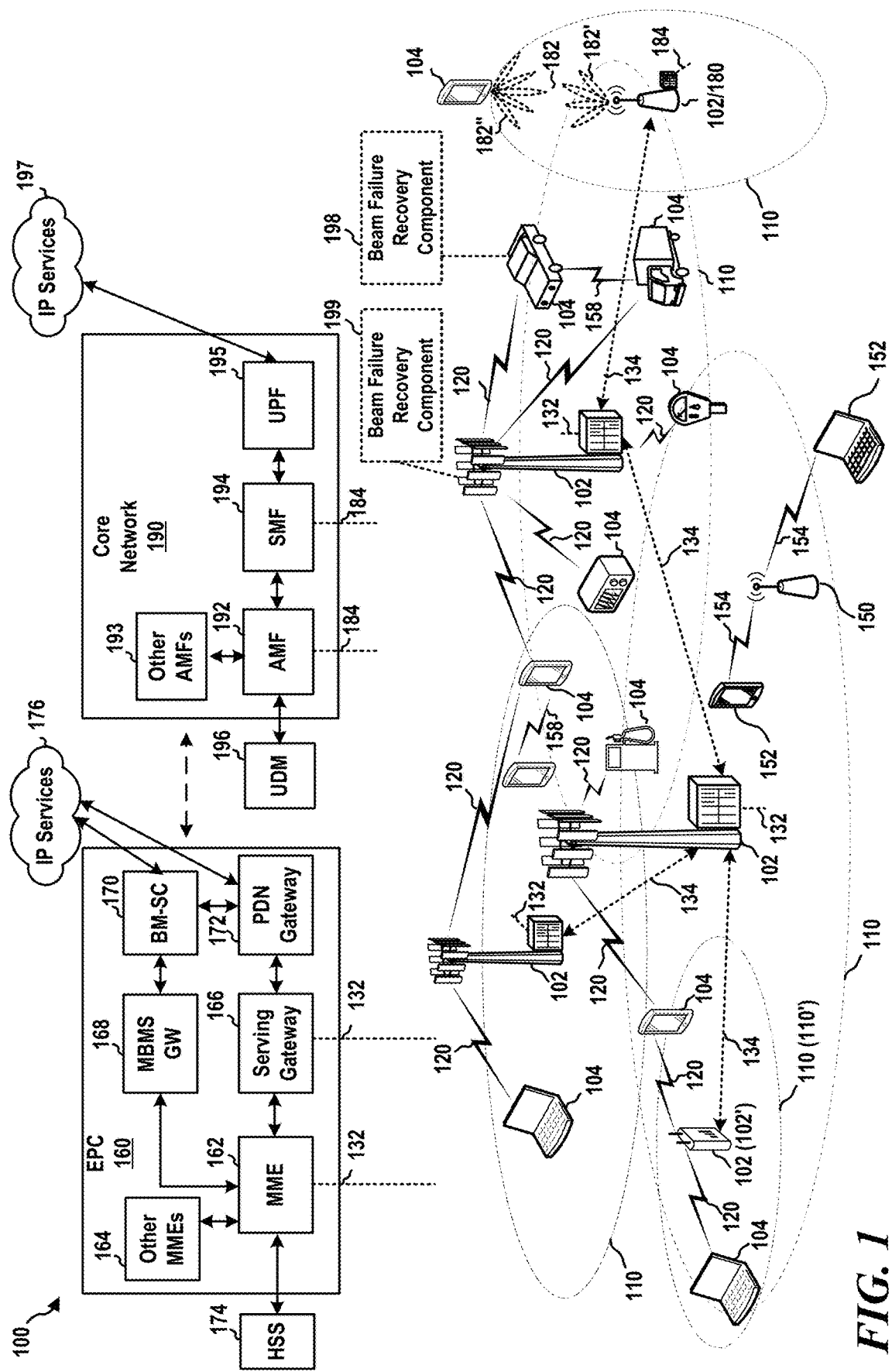
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with, nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications may avoid the overhead involving the routing to and from the base station. Therefore, D2D communications may improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

Sidelink (SL) communications refers to the communications among user equipment (UEs) without tunneling through a base station (BS) and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a base station and a UE. For instance, the PSCCH may carry sidelink control information (SCI) and the PSSCH may carry sidelink data (e.g., user data).

Each PSCCH is associated with a corresponding PSSCH, where SCI in a PSCCH may carry reservation and/or scheduling information for sidelink data transmission in the associated PSSCH. Use cases for sidelink communications may include, among others, vehicle-to-everything (V2X), industrial Internet of things (IIoT), and/or NR-lite.

Sidelink communications may occur in millimeter wave (mmWave) frequencies. Accordingly, beamforming is employed. With beamforming, a transmitting UE beam and a receiving UE beam should be aligned to create a sidelink channel for communications. When beams between communicating sidelink UEs become misaligned, a signal-to-noise ratio (SNR) drops, adversely impacting communications between the UEs. The beams may become misaligned due to movement of a UE or other changes in the environment, such as when a bus moves between two communicating UEs. It is desirable for a UE to detect the misalignment so the UEs may start a beam failure recovery process. The beam failure recovery process includes discovering another set of beams to reestablish the sidelink connection between the sidelink UEs.

According to aspects of the present disclosure, sidelink beam failure recovery may be network assisted. The network may assist regardless of whether a list of reference signals is configured. Additionally, the network may assist in response to a second UE (UE2) identifying a new potential beam and reference signal. In order to obtain an uplink grant to transmit the beam and reference signal information to the base station, UE2 transmits a sidelink link recovery request (SL-LRR) to the base station (e.g., gNB) via a physical uplink control channel (PUCCH). In response, the base station allocates an uplink (UL) grant for UE2 to report the identifier (ID) of a first UE (UE1) and a potential identified beam ID (e.g., sidelink synchronization signal block (SL SSB) ID or sidelink channel state information reference signal (SL CSI-RS) ID). If UE2 already has an uplink grant, the preceding steps for obtaining the uplink grant may be omitted.

With the uplink grant, UE2 sends a sidelink beam failure recovery media access control-control element (SL BFR MAC-CE) to the base station to report the UE ID and the potential identified new candidate beam. The base station then sends the UE ID beam information in the sidelink BFR MAC-CE to UE1. The base station replies to UE2 with a sidelink BFR response, acknowledging reception of the sidelink BFR MAC-CE and also acknowledging that the information was transmitted to UE1. Based on the potential identified new candidate beam, UE1 and UE2 may communicate with the identified new candidate or may conduct more extensive beam training to identify a best new beam pair for sidelink communications.

According to further aspects of the present disclosure, transmission of the beam failure recovery reference signals from the candidate list may be semi-persistent or on demand, instead of always on or periodic, to save resources. In this case, when beam failure is detected, UE2 may send a message to a base station. The base station sends the message to UE1 in order to trigger UE1 to transmit the beam failure recovery reference signals from the candidate list. Thus, the reference signals are not always transmitted, saving resources.

According to further aspects of the present disclosure, UE2 may send the sidelink BFR MAC-CE to another UE (e.g., UE3), which may relay the information in the sidelink BFR MAC-CE to UE1. UE3 may respond to UE2 with a sidelink BFR response message if UE1 successfully receives the sidelink BFR MAC-CE information from UE3.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting evolved MBMS (eMBMS) related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a sidelink device, such as the UE 104, may monitor beam recovery reference signals on one or more beams from one or more other UEs 104, in response to a declared beam failure. A sidelink device, such as the UE 104, may also periodically transmit beam failure recovery reference signals. The UE 104 may include a beam failure recovery component 198 configured to perform these functionalities, and others, to recover from beam failures. The base station 102 may include a beam failure recovery component 199 configured to receive a sidelink beam failure recovery message from a first UE identifying a new candidate beam, and transmit information identifying the new candidate beam to a second sidelink UE, to recover from beam failures.

Although the following description may be focused on 5G NR, it may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe.

Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \cdot 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK) or negative acknowledgement (NACK) feedback. The PUSCH carries data, and may additionally be used to carry a buffer status report (BSR), a power headroom report (PHR), and/or UCI.

Figure 3:
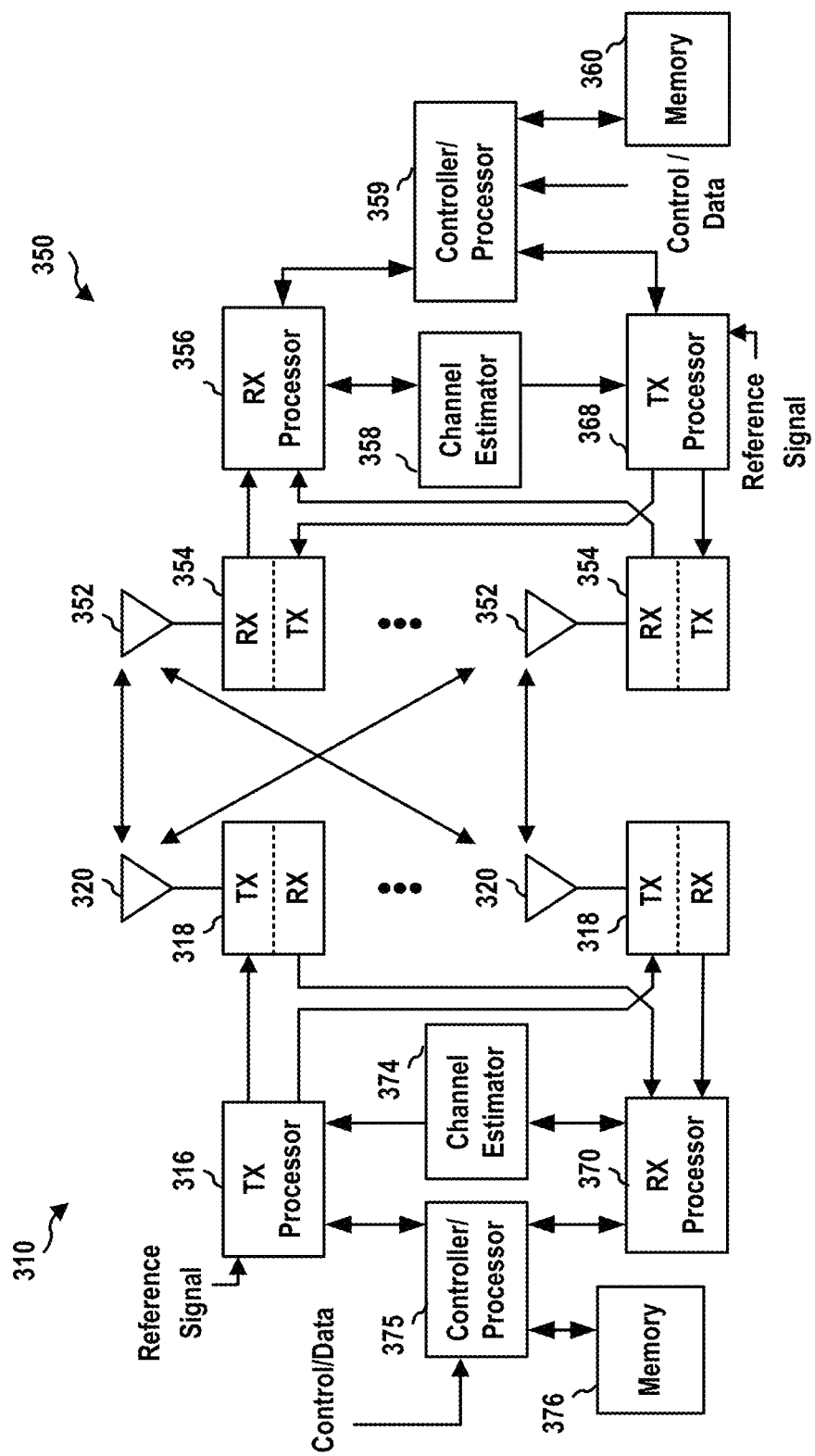
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam failure recovery component 198 of FIG. 1. At least one of the TX processor 316, the RX processor 370, and the controller/processor 375 may be configured to perform aspects in connection with the beam failure recovery component 199 of FIG. 1. In some aspects, the UE 104, 350 and/or base station 102, 310 may include means for transmitting, means for changing, and/or means for receiving. Such means may include one or more components of the UE 104, 350 and/or base station 102, 310 described in connection with FIGS. 1 and 3.

Figure 4:
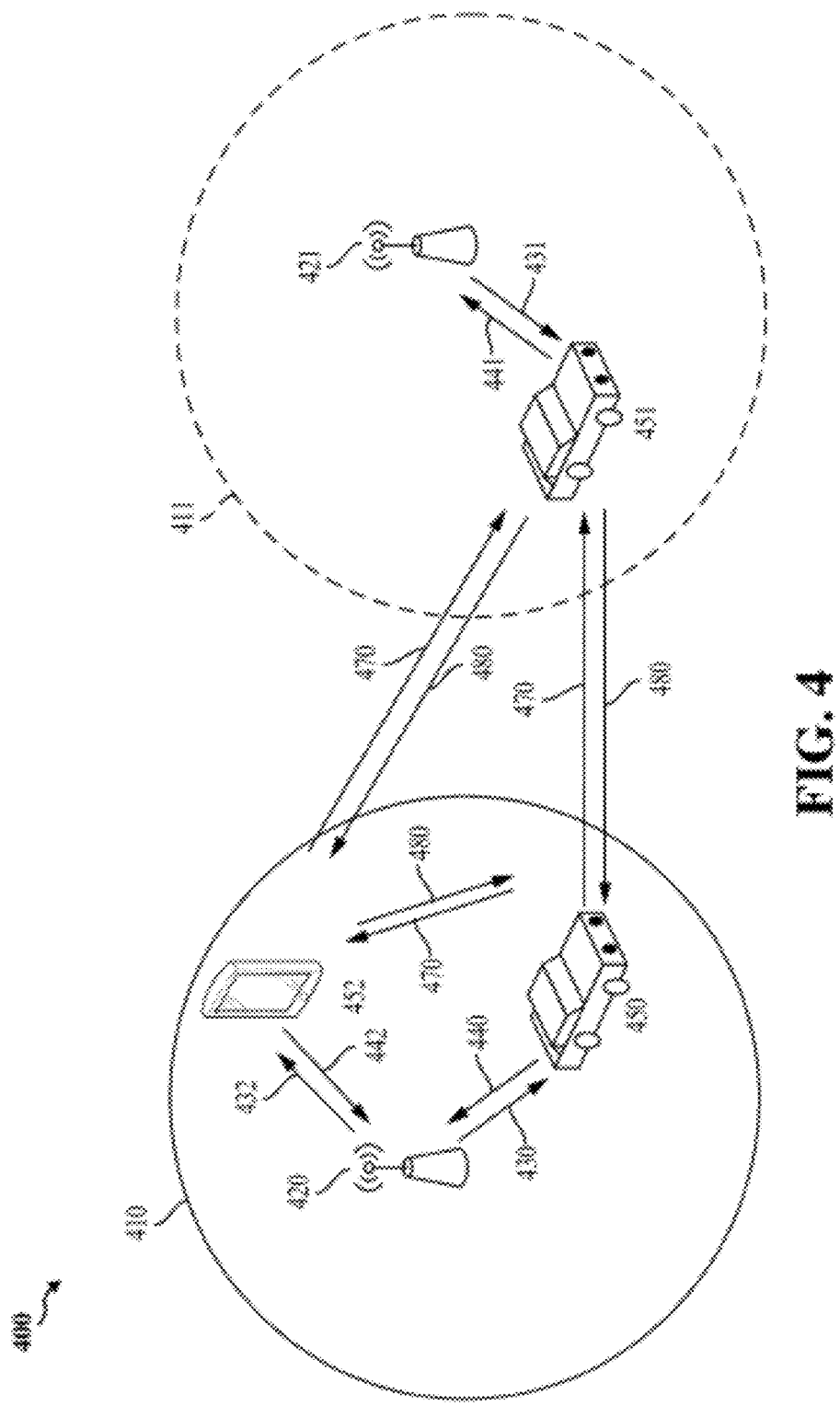
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

Figure 2:
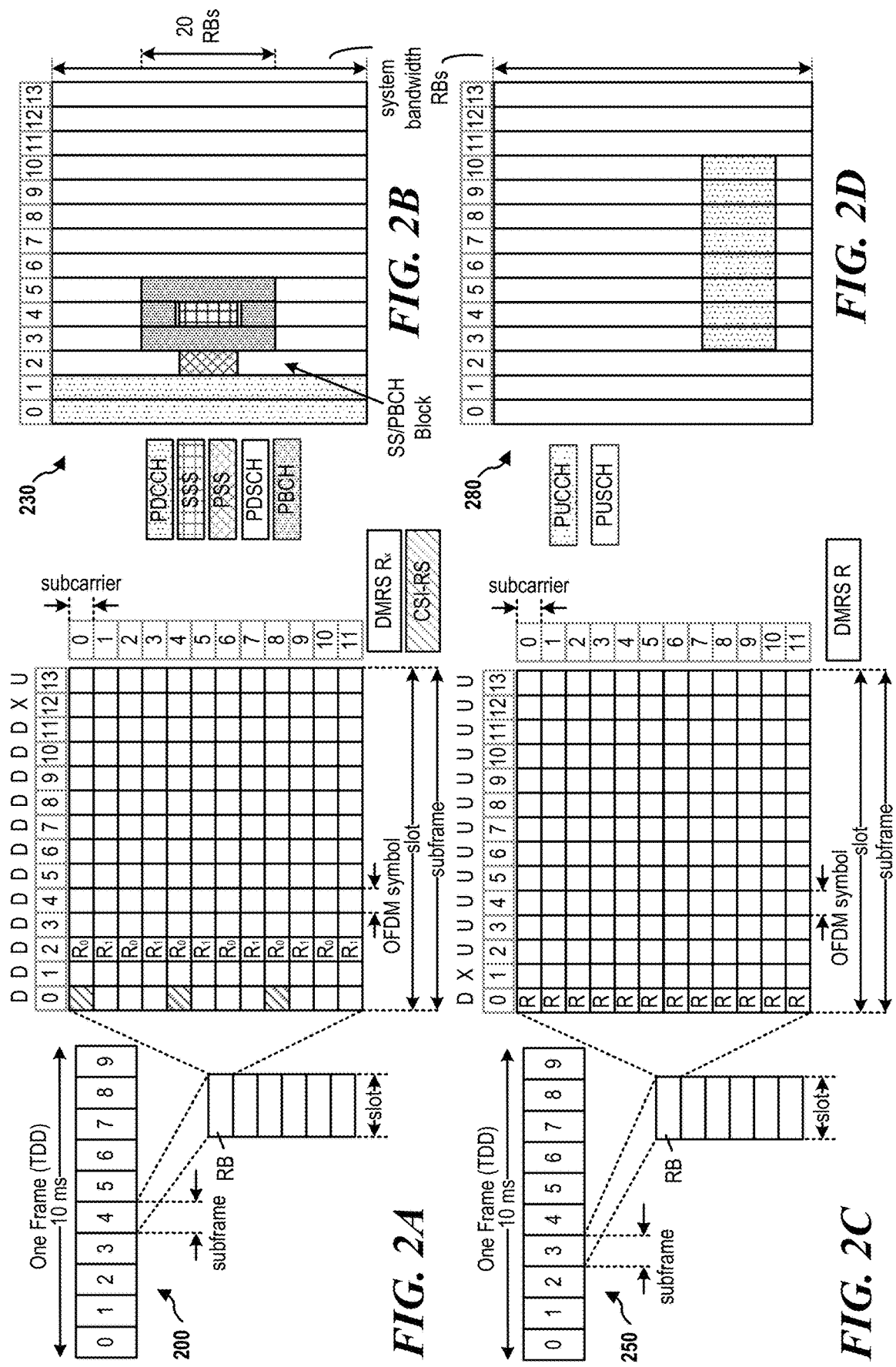
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more frequency division multiplexing (FDM) channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
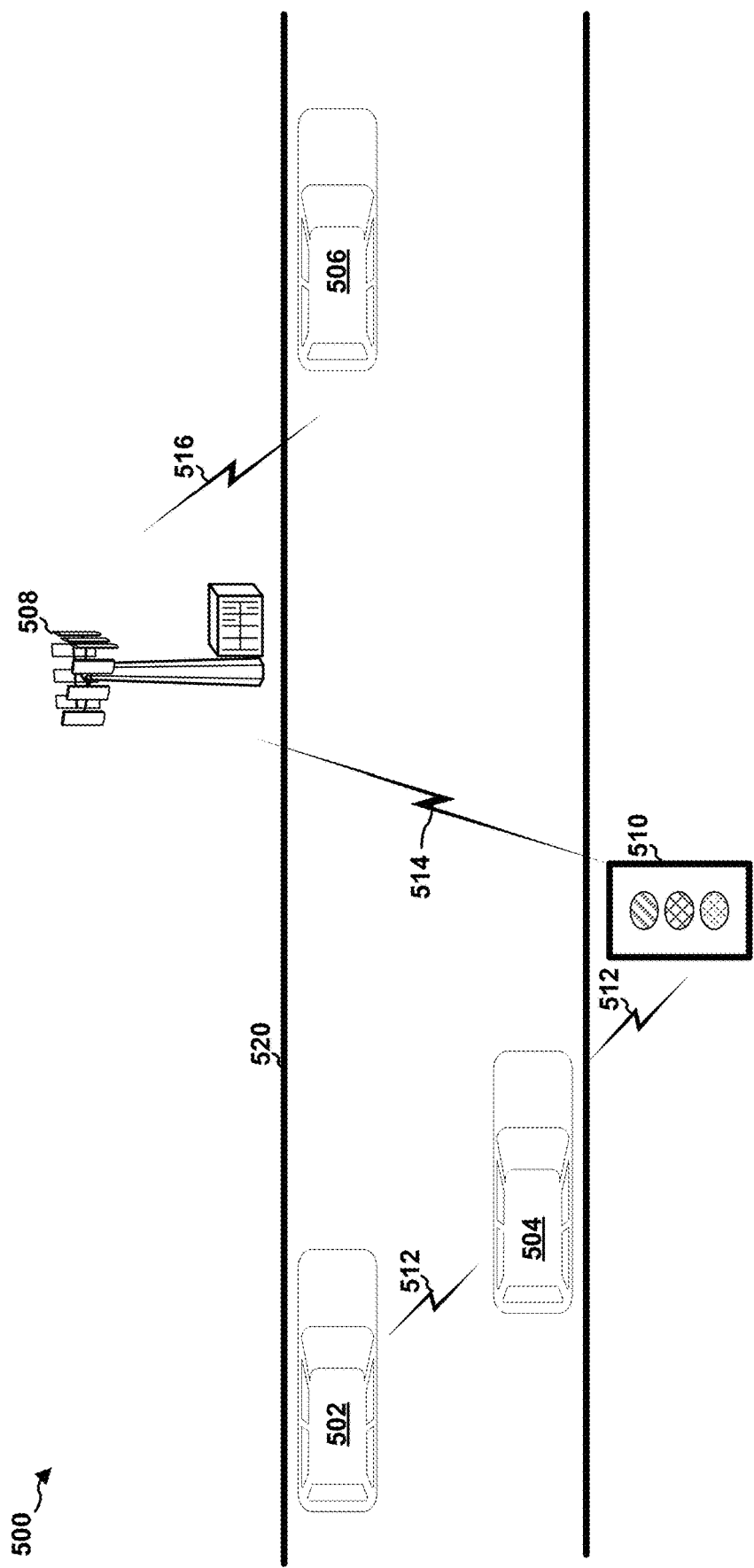
FIG. 5 is a block diagram illustrating an example of a vehicle-to-everything (V2X) system with a road side unit (RSU), according to aspects of the present disclosure.

FIG. 5 illustrates an example of a V2X system 500 with an RSU 510 according to aspects of the present disclosure. As shown in FIG. 5, a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Figure 6:
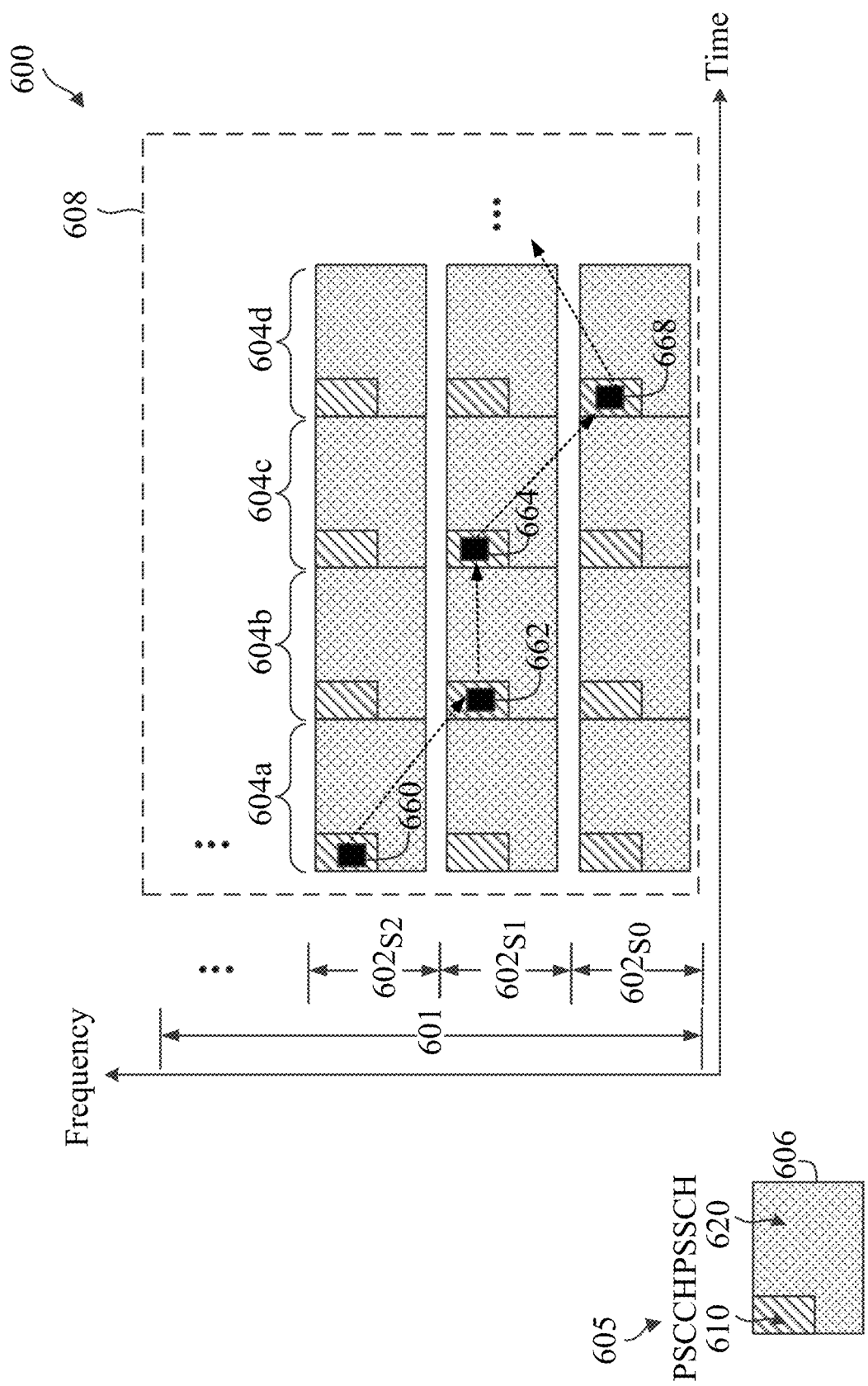
FIG. 6 illustrates a sidelink (SL) communications scheme, in accordance with various aspects of the present disclosure.

FIG. 6 illustrates a sidelink communications scheme 600 according to some aspects of the present disclosure. The scheme 600 may be employed by UEs such as the UEs 104 in a network such as the network 100. In FIG. 6, the x-axis represents time and the y-axis represents frequency.

In the scheme 600, a shared radio frequency band 601 is partitioned into multiple subchannels or frequency subbands 602 (shown as $602_{S0}$, $602_{S1}$, $602_{S2}$) in frequency and multiple sidelink frames 604 (shown as 604a, 604b, 604c, 604d) in time for sidelink communications. The frequency band 601 may be at any suitable frequencies, such as millimeter wave frequencies. The frequency band 601 may have any suitable bandwidth (BW) and may be partitioned into any suitable number of frequency subbands 602. The number of frequency subbands 602 can be dependent on the sidelink communications BW requirement.

Each sidelink frame 604 includes a sidelink resource 606 in each frequency subband 602. A legend 605 indicates the types of sidelink channels within a sidelink resource 606. In some instances, a frequency gap or guard band may be specified between adjacent frequency subbands 602, for example, to mitigate adjacent band interference. The sidelink resource 606 may have a substantially similar structure as an NR sidelink resource. For instance, the sidelink resource 606 may include a number of subcarriers or RBs in frequency and a number of symbols in time. In some instances, the sidelink resource 606 may have a duration between about one millisecond (ms) to about 20 ms. Each sidelink resource 606 may include a PSCCH 610 and a PSSCH 620. The PSCCH 610 and the PSSCH 620 can be multiplexed in time and/or frequency. In the example of FIG. 6, for each sidelink resource 606, the PSCCH 610 is located during the beginning symbol(s) of the sidelink resource 606 and occupies a portion of a corresponding frequency subband 602, and the PSSCH 620 occupies the remaining time-frequency resources in the sidelink resource 606. In some instances, a sidelink resource 606 may also include a physical sidelink feedback channel (PSFCH), for example, located during the ending symbol(s) of the sidelink resource 606. In general, a PSCCH 610, a PSSCH 620, and/or a PSFCH may be multiplexed within a sidelink resource 606.

The PSCCH 610 may carry SCI 660 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 606.

In an NR sidelink frame structure, the sidelink frames 604 in a resource pool 608 may be contiguous in time. A sidelink UE (e.g., the UEs 104) may include, in SCI 660, a reservation for a sidelink resource 606 in a later sidelink frame 604. Thus, another sidelink UE (e.g., a UE in the same NR-U sidelink system) may perform SCI sensing in the resource pool 608 to determine whether a sidelink resource 606 is available or occupied. For instance, if the sidelink UE detected SCI indicating a reservation for a sidelink resource 606, the sidelink UE may refrain from transmitting in the reserved sidelink resource 606. If the sidelink UE determines that there is no reservation detected for a sidelink resource 606, the sidelink UE may transmit in the sidelink resource 606. As such, SCI sensing can assist a UE in identifying a target frequency subband 602 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 602 in one sidelink frame 604 to another frequency subband 602 in another sidelink frame 604. In the illustrated example of FIG. 6, during the sidelink frame 604a, the sidelink UE transmits SCI 660 in the sidelink resource 606 located in the frequency subband $602_{S2}$ to reserve a sidelink resource 606 in a next sidelink frame 604b located at the frequency subband $602_{S1}$. Similarly, during the sidelink frame 604b, the sidelink UE transmits SCI 662 in the sidelink resource 606 located in the frequency subband $602_{S1}$ to reserve a sidelink resource 606 in a next sidelink frame 604c located at the frequency subband $602_{S1}$. During the sidelink frame 604c, the sidelink UE transmits SCI 664 in the sidelink resource 606 located in the frequency subband $602_{S1}$ to reserve a sidelink resource 606 in a next sidelink frame 604d located at the frequency subband $602_{S0}$. During the sidelink frame 604d, the sidelink UE transmits SCI 668 in the sidelink resource 606 located in the frequency subband $602_{S0}$. The SCI 668 may reserve a sidelink resource 606 in a later sidelink frame 604.

The SCI can also indicate scheduling information and/or a destination identifier (ID) identifying a target receiving sidelink UE for the next sidelink resource 606. Thus, a sidelink UE may monitor SCI transmitted by other sidelink UEs. Upon detecting SCI in a sidelink resource 606, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 604 in different frequency subband (e.g., via frequency division multiplexing (FDM)). For instance, in the sidelink frame 604b, one pair of sidelink UEs may communicate sidelink data using a sidelink resource 606 in the frequency subband $602_{S2}$ while another pair of sidelink UEs may communicate sidelink data using a sidelink resource 606 in the frequency subband $602_{S1}$.

In some aspects, the scheme 600 is used for synchronous sidelink communications. That is, the sidelink UEs may be synchronized in time and are aligned in terms of symbol boundary, sidelink resource boundary (e.g., the starting time of sidelink frames 604). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 608 in the frequency band 601, for example, while in coverage of a serving BS. The resource pool 608 may include a plurality of sidelink resources 606. The BS can configure the sidelink UE with a resource pool configuration indicating resources in the frequency band 601 and/or the subbands 602 and/or timing information associated with the sidelink frames 604. In some aspects, the scheme 600 includes mode-2 radio resource allocation (RRA) (e.g., supporting autonomous RRA that can be used for out-of-coverage sidelink UEs or partial-coverage sidelink UEs).

Sidelink communications may occur in millimeter wave (mmWave) frequencies. Accordingly, beamforming is employed. With beamforming, a transmitting UE beam and a receiving UE beam should be aligned to create a sidelink channel for communications. When beams between communicating sidelink UEs become misaligned, a signal-to-noise ratio (SNR) drops, adversely impacting communications between the UEs. The beams may become misaligned due to movement of a UE or other changes in the environment, such as when a bus moves between two communicating UEs. It is desirable for a UE to detect the misalignment so the UEs may initiate a beam failure recovery process. The beam failure recovery process includes discovering another set of beams to reestablish the sidelink connection between the sidelink UEs. The beam failure recovery process may be network assisted.

Figure 7:
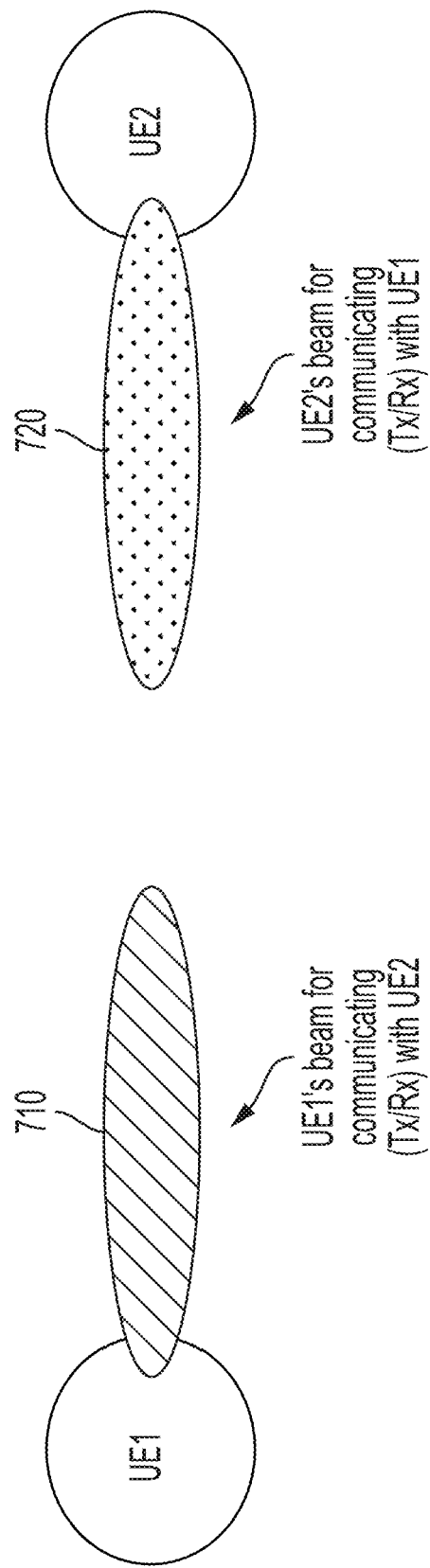
FIG. 7 is a block diagram showing a sidelink channel for a first user equipment (UE) and a second UE, in accordance with aspects of the present disclosure.

FIG. 7 is a block diagram showing a sidelink (SL) channel for a first UE (UE1) and a second UE (UE2), in accordance with aspects of the present disclosure. The sidelink channel includes a beam 710 for UE1 to communicate with UE2. The channel also includes a beam 720 for UE2 to communicate with UE1. In many situations, the transmit (Tx) beam used by UE2 to transmit to UE1 is the same as the receive (Rx) beam used by UE2 to receive from UE1. FIG. 7 shows such a case. However, there are some exceptions (e.g., due to maximum permissible exposure (MPE) limits) when separate beams are employed for transmitting and receiving.

When a sidelink channel between UE1 and UE2 changes or if one or both of UE1 and UE2 move, the sidelink beams 710, 720 will not be aligned, resulting in the UEs not being able to communicate. Aspects of the present disclosure include techniques to recover when sidelink beams are not aligned. The beam failure recovery process may include discovering another set of beams to reestablish the sidelink connection. This process is referred to as beam failure recovery (BFR), and may be network assisted.

Figure 8:
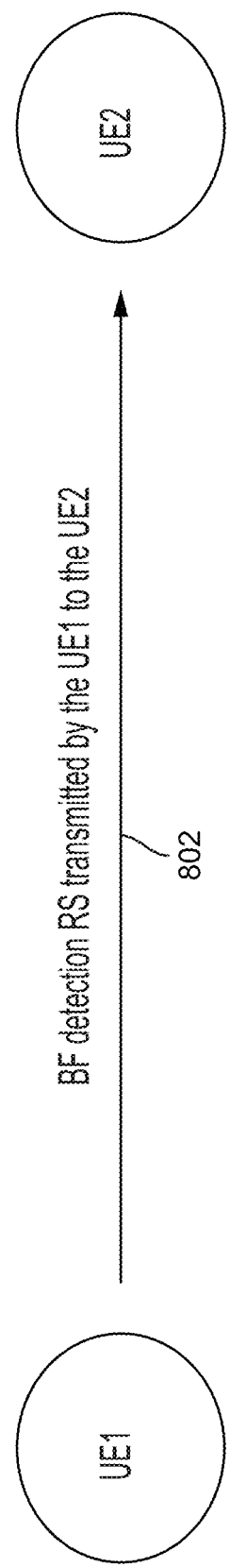
FIG. 8 is a block diagram showing a beam failure detection (BFD) reference signal transmitted by a first user equipment (UE) to a second UE, in accordance with aspects of the present disclosure.

FIG. 8 is a block diagram showing a beam failure detection (BFD) reference signal (or pilot) 802 transmitted by a first UE (UE1) to a second UE (UE2), in accordance with aspects of the present disclosure. UE1 periodically transmits the BFD reference signal 802 on its transmit beams used for communicating with UE2. UE2 has a beam failure detection (BFD) counter configured to count a number of times BFD reference signals 802 from UE1 are received below a threshold level before a BFD timer expires. The threshold level may be a layer one reference signal received power (L1-RSRP) threshold, in one example. If the receive signal strength of the BFD reference signals 802 falls below the threshold a certain number, N, times before the BFD timer expires, UE2 declares beam failure (BF) and triggers beam failure recovery.

Beam failure recovery (BFR) may occur in a number of ways, depending on a UE configuration. For example, UE2 may have been configured by UE1 with a list of reference signals (e.g., slCandidateBeamRsList) for the purpose of beam failure recovery. In this case, UE1 periodically transmits beam failure recovery reference signals from the list of reference signals. Each reference signal in the candidate list is transmitted on a certain beam, though not necessarily the same set of beams used to transmit BFD reference signals 802. The reference signals on the list may be a SL SSB (sidelink synchronization signal block) or a SL CSI-RS (sidelink channel state information-reference signal), in some aspects.

BFR from a perspective of UE2 includes monitoring for reference signals on the candidate list. UE2 may use multiple beams to attempt to receive the reference signals on the list. The beams may not necessarily be the same beams used to receive beam failure detection (BFD) reference signals 802. If a SL SSB or SL CSI-RS on the candidate list has a received signal strength (e.g., RSRP) at or above a threshold (e.g., rsrpThresholdSSB or rsrpThresholdCSI-RS), UE2 selects the reference signal with the signal strength at or above the threshold as a new candidate.

In other aspects of the present disclosure, a list of reference signals (e.g., slCandidateBeamRsList) may not be configured for BFR. In this case, it is assumed that UE1 periodically transmits SL SSB, similar to when the SL SSBs are transmitted for the purpose of discovery and SL link establishment (e.g., during initial access). The SL SSBs are transmitted with a transmit beam sweep (e.g., with multiple different beams), and UE2 selects a transmit-receive beam pair based on monitoring the SL SSBs. For example, UE2 may perform a receive beam sweep for the SL SSBs. UE2 may select a new potential beam, corresponding to a best SL SSB that UE2 received. The best SL SSB may be a SL SSB with a highest RSRP, for example.

According to aspects of the present disclosure, beam failure recovery may be network assisted. The network may assist regardless of whether a list of reference signals (e.g., slCandidateBeamRsList) is configured. The network becomes involved once UE2 identifies a reference signal with the highest received signal strength and the new beam associated with the identified reference signal that UE1 can use to communicate with UE2. In order to obtain an uplink grant to transmit the beam and reference signal information to the base station, UE2 transmits a sidelink link recovery request (SL-LRR) to the base station (e.g., gNB) via a physical uplink control channel (PUCCH). In response, the base station allocates an uplink (UL) grant for UE2 to report the identifier (ID) of UE1 and a potential identified beam ID (e.g., beam with which UE1 transmitted the identified sidelink synchronization signal block (SL SSB) or sidelink channel state information reference signal (SL CSI-RS)). If UE2 already has an uplink grant, the preceding steps may be omitted.

With the uplink grant, UE2 may send a sidelink beam failure recovery media access control-control element (SL BFR MAC-CE) to the base station to report the UE ID and the potential identified new candidate beam. The base station then sends the information in the sidelink BFR MAC-CE to UE1. That is, the base station informs UE1 of the new potential beam UE1 should use to re-establish a sidelink link with UE2. The base station replies to UE2 with a sidelink BFR response, acknowledging reception of the sidelink BFR MAC-CE and also acknowledging that the information was transmitted to UE1. Based on the potential identified new candidate beam, UE1 and UE2 may communicate with the identified new candidate or may conduct more extensive beam training to identify a best new beam pair for sidelink communications.

In some aspects, the sidelink BFR response to UE2 may be a physical downlink control channel (PDCCH) addressed to a cell-radio network temporary identifier (C-RNTI) of UE2. The PDCCH may be of a type indicating an uplink grant for a new transmission (e.g., DCI (downlink control information) format 0_0 or DCI format 0_1). In some aspects, the response is associated with a hybrid automatic repeat request (HARM) process corresponding to the transmission of the sidelink BFR MAC-CE.

Figure 9:
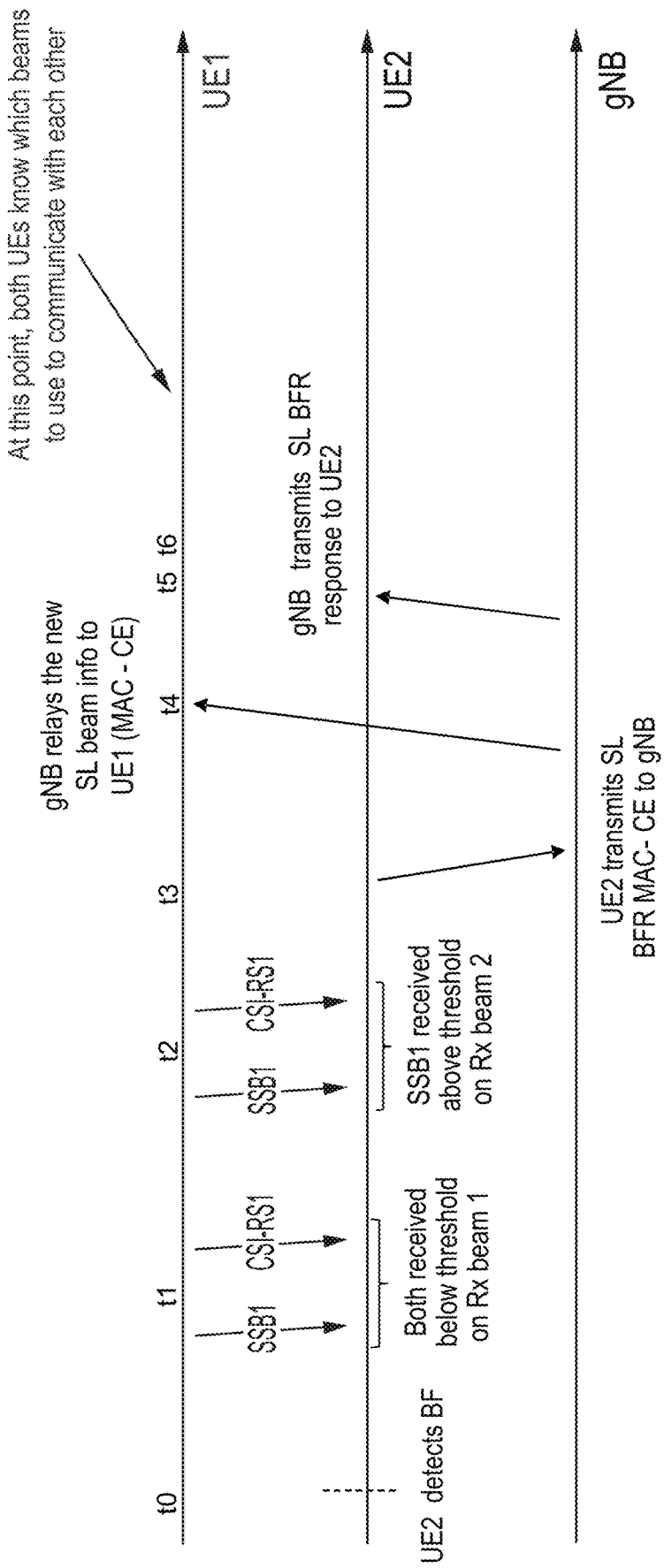
FIG. 9 is a diagram illustrating an exemplary timeline for network assisted beam failure recovery (BFR), in accordance with aspects of the present disclosure.

FIG. 9 is a diagram illustrating an exemplary timeline for network assisted beam failure recovery (BFR), in accordance with aspects of the present disclosure. At time t0, UE2 detects beam failure, for example, based on a number of beam failure detection (BFD) reference signals having a received signal strength below a predetermined threshold. At times t1 and t2, UE1 periodically transmits beam failure recovery reference signals from a candidate list, for example, with various transmit beams. In the example of FIG. 9, UE1 transmits sidelink synchronization signal block 1 (SL SSB1) and sidelink channel state information-reference signal 1 (SL CSI-RS1) on transmit (Tx) beam one and transmit beam two.

UE2 monitors for the reference signals from the candidate list. At time t1, both reference signals are received with a signal strength below a threshold on receive (Rx) beam one. At time t2, however, UE2 receives the SSB1 on receive beam two with a signal strength above the threshold.

Accordingly, at time t3, UE2 transmits a sidelink beam failure recovery (BFR) media access control-control element (MAC-CE) to the base station (e.g., gNB). The sidelink BFR MAC-CE includes an ID of UE1 and the potential identified beam ID, in this example, the UE1 beam used to transmit sidelink synchronization signal block 1 (SL SSB1) to UE2.

At time t4, the base station relays the new sidelink beam information to UE1 (e.g., in a MAC-CE). Although only a single base station is shown, it is understood that UE1 and UE2 may be served by different base stations that communicate with each other. At time t5, the base station transmits a sidelink BFR response (e.g., acknowledgement) to UE2. Finally, at time t6, UE2 receives the acknowledgement and thus both UE1 and UE2 know which beams to use to communicate with each other. UE1 and UE2 may communicate on the identified new candidate beams or may carry out more extensive beam training to identify a best new beam pair for sidelink communications.

In some aspects, the base station serving UE2, to which UE2 sends the sidelink BFR MAC-CE, may be a PCell (primary cell) or an SCell (secondary cell). Additionally, the base station serving UE1, which relays the BFR MAC-CE to UE1, may be a PCell or an SCell.

According to further aspects of the present disclosure, transmission of the beam failure recovery reference signals from the candidate list may be semi-persistent or on demand, instead of always on or periodic, to save resources. In these aspects, when beam failure is detected, UE2 may send a beam failure detection (BFD) message to a base station. The BFD message contains an ID of UE1. The base station sends the message to UE1 in order to trigger UE1 to transmit the beam failure recovery reference signals from the candidate list. Thus, the reference signals are not always transmitted, saving resources.

According to further aspects of the present disclosure, UE2 may send the SL BFR MAC-CE to another UE (e.g., UE3), which can relay the information in the sidelink BFR MAC-CE to UE1. UE3 may respond to UE2 with a sidelink BFR response message if UE1 successfully receives the sidelink BFR MAC-CE information from UE3.

As indicated above, FIGS. 7-9 are provided as examples. Other examples may differ from what is described with respect to FIGS. 7-9.

Figure 10:
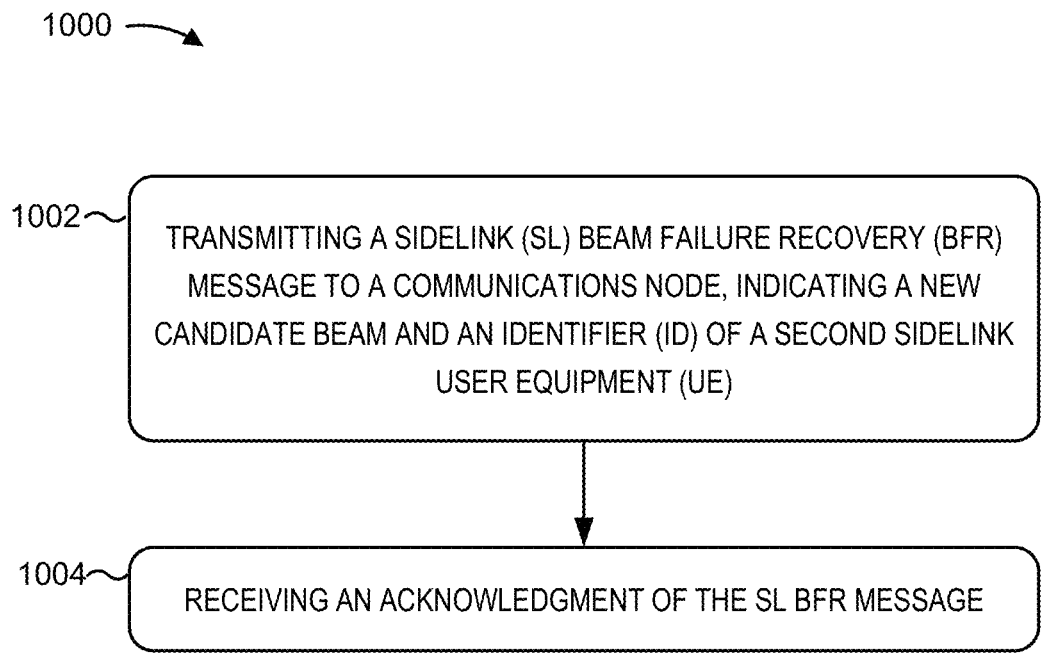
FIG. 10 is a flow diagram illustrating an example process performed, for example, by a sidelink user equipment, in accordance with various aspects of the present disclosure.

FIG. 10 is a flow diagram illustrating an example process 1000 performed, for example, by a first sidelink user equipment (UE), in accordance with various aspects of the present disclosure. The example process 1000 is an example of network assisted sidelink beam failure recovery.

In some aspects, the process 1000 may include transmitting a sidelink (SL) beam failure recovery (BFR) message to a communications node, indicating a new candidate beam and an identifier (ID) of a second sidelink UE (block 1002). For example, the UE (e.g., using the antenna 352, RX/TX 354, TX processor 368, controller/processor 359, and/or memory 360) may transmit the BFR message. The communications node may be a base station or a third sidelink UE. The message may be transmitted on a physical uplink control channel (PUCCH) or a media access control-control element (MAC-CE) to the base station. In some aspects, the UE receives from the base station, an uplink grant for the SL BFR message. The new candidate beam may correspond to a sidelink synchronization signal block (SSB) ID or a sidelink channel state information reference signal (CSI-RS) ID.

In some aspects, the process 1000 may receive an acknowledgment of the SL BFR message (block 1004). For example, the UE (e.g., using the antenna 352, RX/TX 354, RX processor 356, controller/processor 359, and/or memory 360) may receive the acknowledgement. The acknowledgement may indicate the sidelink UE successfully received the SL BFR message from a base station or a third sidelink UE. The acknowledgment may be a physical downlink control channel (PDCCH).

Figure 11:
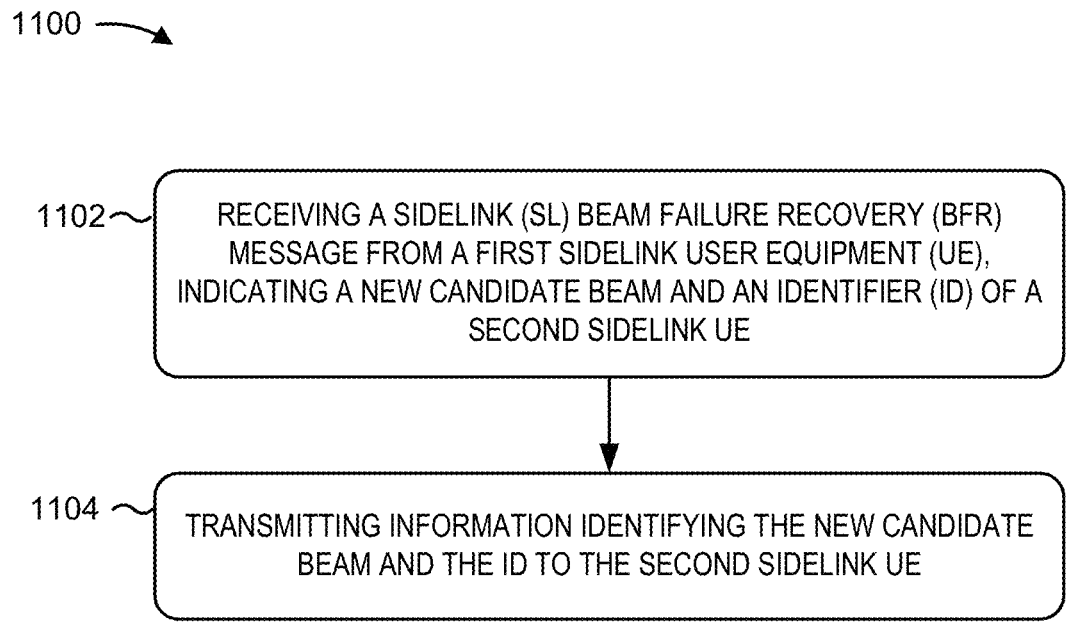
FIG. 11 is a flow diagram illustrating an example process performed, for example, by a communications node, in accordance with various aspects of the present disclosure.

FIG. 11 is a flow diagram illustrating an example process 1100 performed, for example, by a communications node, in accordance with various aspects of the present disclosure. The example process 1100 is an example of network assisted sidelink beam failure recovery.

In some aspects, the process 1100 may include receiving a sidelink (SL) beam failure recovery (BFR) message from a first sidelink user equipment (UE), indicating a new candidate beam and an identifier (ID) of a second sidelink UE (block 1102). For example, the UE or base station (e.g., using the antenna 352, 320, RX/TX 354, 318, RX processor 356, 370, controller/processor 359, 375, and/or memory 360, 376) may receive the BFR message. The communications node may transmit, to the first sidelink UE, a response to the SL BFR message, for example, over a physical downlink control channel (PDCCH). The response may be transmitted with the PDCCH scrambled by a cell radio network temporary identifier (C-RNTI) associated with the first sidelink UE. The communications node may transmit the response in accordance with a hybrid automatic repeat request (HARQ) process corresponding to the SL BFR message. The communications node may be a base station operating as a primary cell or a secondary cell. The communications node may also be a third sidelink UE, in which case the third sidelink UE may transmit to the first sidelink UE, a response to the SL BFR message in response to receiving an acknowledgement from the second sidelink UE.

In some aspects, the process 1100 may transmit information identifying the new candidate beam and the ID to the second sidelink UE (block 1104). For example, the UE or base station (e.g., using the antenna 352, 320, RX/TX 354, 318, TX processor 368, 316, controller/processor 359, 375, and/or memory 360, 376) may transmit the information. In some aspects, the communications node may receive a beam failure detection (BFD) message from the first sidelink UE, the BFD message including an ID of the second sidelink UE. The communications node may also transmit the BFD message to the second sidelink UE, triggering the second sidelink UE to transmit reference signals listed in a sidelink candidate beam reference signal list.

Figure 12:
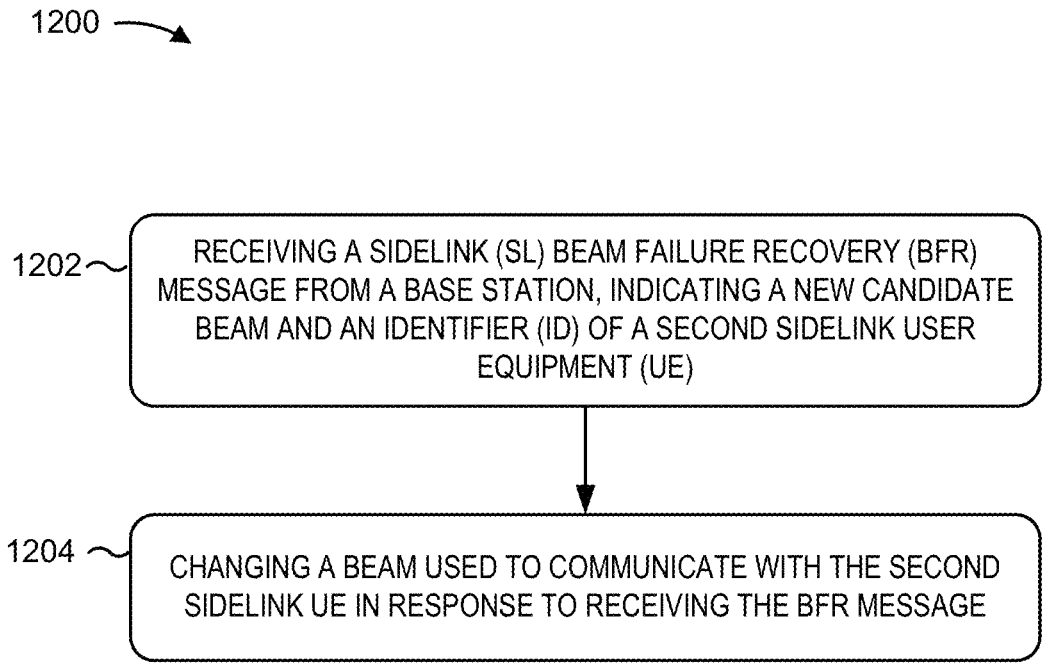
FIG. 12 is a flow diagram illustrating an example process performed, for example, by a sidelink user equipment, in accordance with various aspects of the present disclosure.

FIG. 12 is a flow diagram illustrating an example process 1200 performed, for example, by a first sidelink user equipment (UE), in accordance with various aspects of the present disclosure. The example process 1200 is an example of network assisted sidelink beam failure recovery.

In some aspects, the process 1200 may include receiving a sidelink (SL) beam failure recovery (BFR) message from a base station, indicating a new candidate beam and an identifier (ID) of a second sidelink UE (block 1202). For example, the UE (e.g., using the antenna 352, RX/TX 354, RX processor 356, controller/processor 359, and/or memory 360) may receive the BFR message. In some aspects, the UE may receive a sidelink (SL) beam failure detection (BFD) message from the base station, and may transmit, to the second sidelink UE, a set of beam failure recovery (BFR) reference signals (RSs) in response to receiving the BFD message.

In some aspects, the process 1200 may change a beam used to communicate with the second sidelink UE in response to receiving the BFR message (block 1204). For example, the UE (e.g., using the antenna 352, RX/TX 354, TX processor 368, RX processor 356, controller/processor 359, and/or memory 360) may change the beam.

Implementation examples are described in the following numbered clauses

1. A method of wireless communication by a first sidelink user equipment (UE), comprising:
   transmitting a sidelink (SL) beam failure recovery (BFR) message to a communications node, indicating a new candidate beam and an identifier (ID) of a second sidelink UE; and
   receiving an acknowledgment of the SL BFR message.
2. The method of clause 1, in which the communications node is a base station.
3. The method of clause 1 or 2, in which the acknowledgment indicates the second sidelink UE successfully received the SL BFR message from the base station.
4. The method of any of the preceding clauses, further comprising: transmitting a sidelink link recovery request (SL-LRR) to the base station; and receiving an uplink grant for the SL BFR message.
5. The method of any of the preceding clauses, further comprising transmitting the SL-LRR to the base station on a physical uplink control channel (PUCCH).
6. The method of any of the preceding clauses, in which the new candidate beam corresponds to a sidelink synchronization signal block (SSB) ID or a sidelink channel state information reference signal (CSI-RS) ID.
7. The method of any of the preceding clauses, in which the SL BFR message is carried in a media access control-control element (MAC-CE).
8. The method of any of the preceding clauses, in which the acknowledgment comprises a physical downlink control channel (PDCCH).
9. The method of any of clauses 1, or 3-8, in which the communications node is a third sidelink UE.
10. The method of any of clauses 1, or 3-9, in which the acknowledgment indicates the second sidelink UE successfully received the SL BFR message from the third sidelink UE.
11. A method of wireless communication by a communications node, comprising:
    receiving a sidelink (SL) beam failure recovery (BFR) message from a first sidelink user equipment (UE), indicating a new candidate beam and an identifier (ID) of a second sidelink UE; and
    transmitting information identifying the new candidate beam and the ID to the second sidelink UE.
12. The method of clause 11, further comprising transmitting, to the first sidelink UE, a response to the SL BFR message.
13. The method of clause 11 or 12, further comprising transmitting the response to the SL BFR message over a physical downlink control channel (PDCCH).
14. The method of any of the clauses 11-13, further comprising transmitting the response to the SL BFR message with the PDCCH scrambled by a cell radio network temporary identifier (C-RNTI) associated with the first sidelink UE.
15. The method of any of the clauses 11-14, further comprising transmitting the response in accordance with a hybrid automatic repeat request (HARQ) process corresponding to the SL BFR message.
16. The method of any of the clauses 11-15, in which the communications node is a base station.
17. The method of any of the clauses 11-16, in which the base station comprises a primary cell or a secondary cell.
18. The method of any of the clauses 11-17, further comprising transmitting, to the first sidelink UE, a response to the SL BFR message in response to receiving an acknowledgement from the second sidelink UE.
19. The method of any of the clauses 11-15 or 17, in which the communications node is a third sidelink UE.
20. The method of any of the clauses 11-19, further comprising transmitting, to the first sidelink UE, a response to the SL BFR message in response to receiving an acknowledgement from the second sidelink UE.
21. The method of any of the clauses 11-20, further comprising:
    receiving a beam failure detection (BFD) message from the first sidelink UE, the BFD message including an ID of the second sidelink UE; and
    transmitting the BFD message to the second sidelink UE, triggering the second sidelink UE to transmit reference signals listed in a sidelink candidate beam reference signal list.

22. A method of wireless communication by a first sidelink user equipment (UE), comprising:
  receiving a sidelink (SL) beam failure recovery (BFR) message from a base station, indicating a new candidate beam and an identifier (ID) of a second sidelink UE; and
  changing a beam used to communicate with the second sidelink UE in response to receiving the BFR message.
23. The method of clause 22, further comprising:
  receiving a sidelink (SL) beam failure detection (BFD) message from the base station; and
  transmitting, to the second sidelink UE, a set of beam failure recovery (BFR) reference signals (RSs) in response to receiving the BFD message.
24. An apparatus for wireless communications by a communications node, comprising:
  a processor;
  memory coupled with the processor; and
  instructions stored in the memory and operable, when executed by the processor, to cause the apparatus:
    to receive a sidelink (SL) beam failure recovery (BFR) message from a first sidelink user equipment (UE), indicating a new candidate beam and an identifier (ID) of a second sidelink UE; and
    to transmit information identifying the new candidate beam and the ID to the second sidelink UE.
25. The apparatus of clause 24, in which the communications node is a base station.
26. The apparatus of clause 24 or 25, in which the processor causes the apparatus to transmit, to the first sidelink UE, a response to the SL BFR message in response to receiving an acknowledgement from the second sidelink UE.
27. The apparatus of any of the clauses 24 or 26, in which the communications node is a third sidelink UE.
28. The apparatus of any of the clauses 24-27, in which the processor causes the apparatus to transmit, to the first sidelink UE, a response to the SL BFR message in response to receive an acknowledgement from the second sidelink UE.
29. The apparatus of any of the clauses 24-28, in which the processor causes the apparatus:
  to receive a beam failure detection (BFD) message from the first sidelink UE, the BFD message including an ID of the second sidelink UE; and
  to transmit the BFD message to the second sidelink UE, triggering the second sidelink UE to transmit reference signals listed in a sidelink candidate beam reference signal list.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a first sidelink user equipment (UE), comprising:
  transmitting a sidelink (SL) beam failure recovery (BFR) message to a communications node, indicating a new candidate beam and an identifier (ID) of a second sidelink UE; and
  receiving an acknowledgment of the SL BFR message, the acknowledgment indicating that information in the SL BFR message was transmitted to the second sidelink UE.

2. The method of claim 1, wherein the communications node is a base station.

3. The method of claim 2, wherein the acknowledgment indicates the second sidelink UE successfully received the SL BFR message from the base station.

4. The method of claim 2, further comprising:
  transmitting a sidelink link recovery request (SL-LRR) to the base station; and
  receiving an uplink grant for the SL BFR message.

5. The method of claim 4, further comprising transmitting the SL-LRR to the base station on a physical uplink control channel (PUCCH).

6. The method of claim 2, wherein the new candidate beam corresponds to a sidelink synchronization signal block (SSB) ID or a sidelink channel state information reference signal (CSI-RS) ID.

7. The method of claim 2, wherein the SL BFR message is carried in a media access control-control element (MAC-CE).

8. The method of claim 2, wherein the acknowledgment comprises a physical downlink control channel (PDCCH).

9. The method of claim 1, wherein the communications node is a third sidelink UE.

10. The method of claim 9, wherein the acknowledgment indicates the second sidelink UE successfully received the SL BFR message from the third sidelink UE.

11. A method of wireless communication by a communications node, comprising:
    receiving a sidelink (SL) beam failure recovery (BFR) message from a first sidelink user equipment (UE), indicating a new candidate beam and an identifier (ID) of a second sidelink UE;
    transmitting information identifying the new candidate beam and the ID to the second sidelink UE; and
    transmitting, to the first sidelink UE, a response to the SL BFR message in response to receiving an acknowledgement from the second sidelink UE.

12. The method of claim 11, further comprising transmitting the response to the SL BFR message over a physical downlink control channel (PDCCH).

13. The method of claim 12, further comprising transmitting the response to the SL BFR message with the PDCCH scrambled by a cell radio network temporary identifier (C-RNTI) associated with the first sidelink UE.

14. The method of claim 11, further comprising transmitting the response in accordance with a hybrid automatic repeat request (HARQ) process corresponding to the SL BFR message.

15. The method of claim 11, wherein the communications node is a base station.

16. The method of claim 15, wherein the base station comprises a primary cell or a secondary cell.

17. The method of claim 11, wherein the communications node is a third sidelink UE.

18. The method of claim 17, further comprising transmitting, to the first sidelink UE, a response to the SL BFR message in response to receiving an acknowledgement from the second sidelink UE.

19. The method of claim 11, further comprising:
    receiving a beam failure detection (BFD) message from the first sidelink UE, the BFD message including an ID of the second sidelink UE; and
    transmitting the BFD message to the second sidelink UE, triggering the second sidelink UE to transmit reference signals listed in a sidelink candidate beam reference signal list.

20. An apparatus for wireless communications by a communications node, comprising:
    a processor;
    memory coupled with the processor; and
    instructions stored in the memory and operable, when executed by the processor, to cause the apparatus to:
        receive a sidelink (SL) beam failure recovery (BFR) message from a first sidelink user equipment (UE), indicating a new candidate beam and an identifier (ID) of a second sidelink UE;
        transmit information identifying the new candidate beam and the ID to the second sidelink UE; and
        transmit, to the first sidelink UE, a response to the SL BFR message in response to receiving an acknowledgment from the second sidelink UE.

21. The apparatus of claim 20, wherein the communications node is a base station.

22. The apparatus of claim 20, wherein the communications node is a third sidelink UE.

23. The apparatus of claim 20, wherein the processor causes the apparatus to:
    receive a beam failure detection (BFD) message from the first sidelink UE, the BFD message including an ID of the second sidelink UE; and
    transmit the BFD message to the second sidelink UE, triggering the second sidelink UE to transmit reference signals listed in a sidelink candidate beam reference signal list.

* * * * *